US008974865B2

(12) United States Patent
Lin et al.

(10) Patent No.: US 8,974,865 B2
(45) Date of Patent: Mar. 10, 2015

(54) COMPONENT AND A METHOD OF PROCESSING A COMPONENT

(75) Inventors: Dechao Lin, Greer, SC (US); Yan Cui, Greer, SC (US); Srikanth Chandrudu Kottilingam, Simpsonville, SC (US); Ganjiang Feng, Greenville, SC (US)

(73) Assignee: General Electric Company, Schenectady, NY (US)

( * ) Notice: Subject to any disclaimer, the term of this patent is extended or adjusted under 35 U.S.C. 154(b) by 747 days.

(21) Appl. No.: 13/032,821

(22) Filed: Feb. 23, 2011

(65) Prior Publication Data

US 2012/0214019 A1    Aug. 23, 2012

(51) Int. Cl.
| | | |
|---|---|---|
| B32B 15/00 | (2006.01) |
| B23K 9/04 | (2006.01) |
| C23C 28/02 | (2006.01) |
| C22C 19/00 | (2006.01) |
| B23K 35/30 | (2006.01) |
| B23P 6/00 | (2006.01) |
| F01D 5/00 | (2006.01) |
| F01D 5/28 | (2006.01) |
| B23K 35/00 | (2006.01) |

(52) U.S. Cl.
CPC .............. *B23K 9/04* (2013.01); *B23K 35/3033* (2013.01); *B23K 2201/001* (2013.01); *B23P 6/007* (2013.01); *C23C 28/021* (2013.01); *F01D 5/005* (2013.01); *F01D 5/288* (2013.01); F05D 2230/80 (2013.01); F05D 2230/90 (2013.01); *B23K 35/00* (2013.01)
USPC ........... 427/455; 427/202; 228/119; 428/678; 428/679; 428/680; 428/681; 428/682; 428/615

(58) Field of Classification Search
USPC ........... 427/455, 191, 202, 205; 428/678–682
See application file for complete search history.

(56) References Cited

U.S. PATENT DOCUMENTS

| 4,561,914 | A | * | 12/1985 | Pavelic et al. .................... 148/26 |
|---|---|---|---|---|
| 4,633,554 | A | * | 1/1987 | Clark et al. ..................... 29/888 |
| 6,085,417 | A | * | 7/2000 | Anderson et al. ............ 29/889.1 |
| 7,727,318 | B2 | | 6/2010 | Feng et al. |
| 7,775,414 | B2 | | 8/2010 | Ditzel et al. |
| 7,842,402 | B2 | | 11/2010 | Feng et al. |
| 7,846,243 | B2 | | 12/2010 | Hardwicke et al. |
| 2003/0052110 | A1 | * | 3/2003 | Gandy et al. ............... 219/137.7 |
| 2004/0197220 | A1 | * | 10/2004 | Katsuragi et al. ............... 420/97 |
| 2004/0223868 | A1 | | 11/2004 | King et al. |
| 2005/0069450 | A1 | | 3/2005 | Jiang et al. |
| 2005/0214563 | A1 | | 9/2005 | Feng et al. |
| 2007/0095441 | A1 | | 5/2007 | Jiang et al. |

(Continued)

OTHER PUBLICATIONS

Funderbark, "Key Concepts in Welding Engineering", Welding Innovation vol. XVI, No. 2, 1999.*

*Primary Examiner* — Humera Sheikh
*Assistant Examiner* — Lucas Wang
(74) *Attorney, Agent, or Firm* — McNees Wallace & Nurick LLC

(57) ABSTRACT

A component and a method of processing a component are disclosed. The method includes providing a base metal having a feature, removing the feature to form a processed region, applying a first layer to the processed region, and applying a second layer to the first layer. The base metal, the first layer, and the second layer each have predetermined thermal expansion coefficients, yield strengths, and elongations. The processed component includes the first layer applied to a processed region of the base metal and a second layer applied to the first layer.

20 Claims, 1 Drawing Sheet

(56) References Cited

U.S. PATENT DOCUMENTS

| | | |
|---|---|---|
| 2008/0014094 A1 | 1/2008 | Itzel et al. |
| 2008/0163784 A1 | 7/2008 | Hardwicke et al. |
| 2008/0163785 A1 | 7/2008 | Hardwicke et al. |
| 2008/0163786 A1 | 7/2008 | Feng et al. |
| 2008/0210347 A1* | 9/2008 | Morin et al. ................. 148/527 |
| 2008/0245445 A1 | 10/2008 | Helmick et al. |
| 2010/0034692 A1 | 2/2010 | Feng et al. |
| 2010/0059573 A1 | 3/2010 | Kottilingam et al. |
| 2010/0119871 A1 | 5/2010 | Feng et al. |
| 2010/0135847 A1 | 6/2010 | Jiang et al. |
| 2011/0062220 A1* | 3/2011 | Feng et al. ................... 228/119 |
| 2011/0097142 A1* | 4/2011 | Bassler et al. ................ 403/337 |
| 2012/0103950 A1* | 5/2012 | Arjakine et al. .......... 219/121.64 |

* cited by examiner

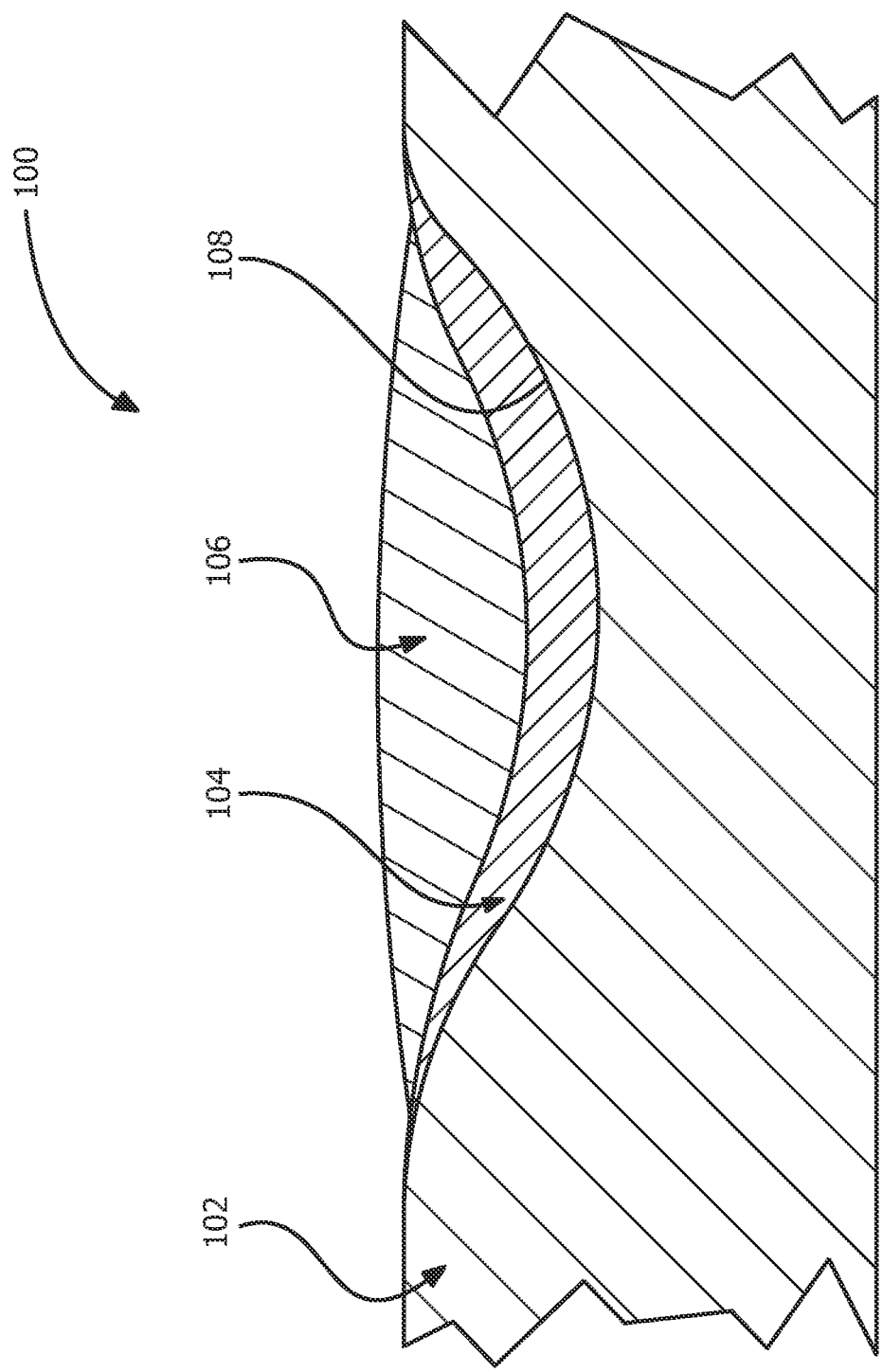

COMPONENT AND A METHOD OF PROCESSING A COMPONENT

FIELD OF THE INVENTION

The present invention is generally directed to methods of processing gas turbine components and gas turbine components. More specifically, the present invention is directed to methods of processing gas turbine diaphragms and processed gas turbine diaphragms.

BACKGROUND OF THE INVENTION

Gas turbine components are subjected to both thermally, mechanically and chemically hostile environments. For example, in the compressor portion of a gas turbine, atmospheric air is compressed to 10-25 times atmospheric pressure, and adiabatically heated to 800°-1250° F. (427° C.-677° C.) in the process. This heated and compressed air is directed into a combustor, where it is mixed with fuel. The fuel is ignited, and the combustion process heats the gases to very high temperatures, in excess of 3000° F. (1650° C.). These hot gases pass through the turbine, where airfoils fixed to rotating turbine disks extract energy to drive the fan and compressor of the turbine, and the exhaust system, where the gases provide sufficient energy to rotate a generator rotor to produce electricity. To improve the efficiency of operation of the turbine, combustion temperatures have been raised.

A processed gas turbine component and a method of processing a gas turbine component by welding without cracks inside a weld and/or an interface capable of operating with higher temperatures would be desirable in the art.

BRIEF DESCRIPTION OF THE INVENTION

According to an exemplary embodiment, a method of processing a component includes providing a base metal having a feature, the base metal having a base metal composition, a base metal thermal expansion coefficient, a base metal yield strength, and a base metal elongation, removing the feature to form a processed region, applying a first layer to the processed region, the first layer having a first filler, the first filler having a first filler composition, a first filler thermal expansion coefficient, a first filler yield strength, and a first filler elongation, and applying a second layer to the first layer, the second layer having a second filler, the second filler having a second filler composition, a second filler thermal expansion coefficient, a second filler yield strength, and a second filler elongation. The first filler thermal expansion coefficient is less than both the base metal thermal expansion coefficient and the second filler thermal expansion coefficient. The first filler yield strength is greater than the base metal yield strength and less than the second filler yield strength. The first filler elongation is greater than the base metal elongation and less than the second filler elongation.

According to another exemplary embodiment, a method of processing a component includes providing a base metal having a feature, the base metal having a base metal composition, a base metal thermal expansion coefficient, a base metal yield strength, and a base metal elongation, removing the feature to form a processed region, applying a first layer to the processed region, the first layer having a first filler, the first filler having a first filler composition, a first filler thermal expansion coefficient, a first filler yield strength, and a first filler elongation, and applying a second layer to the first layer, the second layer having a second filler, the second filler having a second filler composition, a second filler thermal expansion coefficient, a second filler yield strength, and a second filler elongation. The first filler composition includes by weight between about 1.0 percent and about 1.5 percent carbon, between about 42.5 percent and about 47.5 percent iron, and a balance of nickel, and wherein the second filler composition includes by weight up to about 0.1 percent carbon, about 20 percent to about 23 percent chromium, about 5.0 percent iron, about 1.0 percent cobalt, between about 8.0 percent and about 10.0 percent molybdenum, between about 20 percent and about 23 percent chromium, and a balance of nickel.

According to another exemplary embodiment, a processed component includes a base metal having a base metal composition, a base metal thermal expansion coefficient, a base metal yield strength, and a base metal elongation, a processed region, a first layer applied to the processed region, the first layer having a first filler, the first filler having a first filler composition, a first filler thermal expansion coefficient, a first filler yield strength, and a first filler elongation, and a second layer applied to the first layer, the second layer having a second filler, the second filler having a second filler composition, a second filler thermal expansion coefficient, a second filler yield strength, and a second filler elongation. The first filler thermal expansion coefficient is less than both the base metal thermal expansion coefficient and the second filler thermal expansion coefficient. The first filler yield strength is greater than the base metal yield strength and less than the second filler yield strength. The first filler elongation is greater than the base metal elongation and less than the second filler elongation.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 schematically shows a processed component according to an embodiment of the disclosure.

Wherever possible, the same reference numbers will be used throughout the drawings to represent the same parts.

DETAILED DESCRIPTION OF THE INVENTION

Provided are a processed component and a method of processing a component having a weld without cracks inside the weld and/or cracks inside an interface of the weld.

Referring to FIG. 1, an exemplary processed component 100 includes a base metal 102, a first layer 104 with a first filler, and a second layer 106 with a second filler. As used herein the term "layer" refers to a filler material deposited through welding. The processed component 100 is a metal component. In one embodiment, the processed component is a gas turbine component such as a blade, rotor, a diaphragm, a bucket, or dovetail. According to an exemplary process, the first layer 104 is applied to a surface deformity 108 (for example, a cavity, a crack, a chip, a hole, a fissure, or other suitable surface feature) in the base metal 102 of the component 100. The second layer 106 is then applied on the first layer 104. As will be appreciated, the second layer 106 may remain separate from the base metal 102 and/or may partially contact the base metal 102, depending upon the complexity of the weld and the technique utilized by the welder.

The base metal 102 includes a base metal composition, a base metal thermal expansion coefficient, a base metal yield strength, and a base metal elongation. In an exemplary embodiment of the processed component 100, the first layer 104 is positioned proximal to the base metal 102. The first layer 104 has a first filler composition, a first filler thermal expansion coefficient, a first filler yield strength, and a first filler elongation. The second layer 106 is positioned proximal to the first layer 104. The second layer 106 has a second filler composition, a second filler thermal expansion coefficient, a second filler yield strength, and a second filler elongation.

The first layer 104 and the second layer 106 are selected based upon one or more predetermined properties. For example, in one embodiment, the first layer 104 and the second layer 106 are selected in response to the base metal composition, the base metal thermal expansion coefficient, the base metal yield strength, the base metal elongation, and combinations thereof. For example, in one embodiment, to make the first layer 104, a first filler metal is selected such that the first filler composition includes less carbon content, less iron content, and higher nickel content than a second filler for making the second layer 106. In another embodiment, to make the first layer 104 and/or the second layer 106, the first filler and/or the second filler are selected such that the first filler thermal expansion coefficient is less than both the base metal thermal expansion coefficient and the second filler thermal expansion coefficient. In another embodiment, to make the first layer 104 and/or the second layer 106, the first filler and/or the second filler are selected such that the second filler yield strength is greater than both the base metal yield strength and the first filler yield strength.

The selection of the first filler to make the first layer 104 and/or the second filler to make the second layer 106 is based upon the specific identifiable and quantifiable relationships and/or differences between the base metal 102 and the first layer 104 and/or the second layer 106. For example, in one embodiment, the first filler and/or the second filler is selected such that the difference in the thermal expansion range of the first filler and/or the second filler in comparison to the base metal 102 is a predetermined difference of thermal expansion. In this embodiment, the first filler thermal expansion coefficient is less than the base metal thermal expansion coefficient and the second filler thermal expansion coefficient is greater than the first filler thermal expansion coefficient.

In one embodiment, the predetermined difference of thermal expansion coefficient between the first filler to make the first layer 104 and the base metal 102 is between about 7.0 μm/m·K and about 8.0 μm/m·K (i.e., the value of the base metal thermal expansion coefficient minus the value of the first filler thermal expansion coefficient), 6.0 μm/m·K and about 9.0 μm/m·K, 5.0 μm/m·K and about 10.0 μm/m·K, at about 6.5 μm/m·K, at about 7.0 μm/m·K, at about 7.5 μm/m·K, or at about 8.0 μm/m·K. Additionally or alternatively, the first filler to make the first layer 104 has a thermal expansion coefficient between about 65 percent and about 75 percent lower than the base metal 102 (i.e., the value of the base metal thermal expansion coefficient minus the value of the first filler thermal expansion coefficient and all divided by the value of the base metal thermal expansion coefficient).

In one embodiment, the predetermined difference of the thermal expansion coefficient between the first filler to make the first layer 104 and the second layer 106 is between about 2.3 μm/m·K and about 3.3 μm/m·K (i.e., the value of the second filler thermal expansion coefficient minus the value of the first filler thermal expansion coefficient), between about 1.3 μm/m·K and about 4.3 μm/m·K, between about 1.8 μm/m·K and about 3.8 μm/m·K, at about 2.3 μm/m·K, at about 2.6 μm/m·K, or at about 2.9 μm/m·K. Additionally or alternatively, the first filler to make the first layer 104 has a thermal expansion coefficient between about 18 percent and about 26 percent lower than the second layer 106 (i.e., the value of the second filler thermal expansion coefficient minus the value of the first filler thermal expansion coefficient and all divided by the value of the second filler thermal expansion coefficient).

In one embodiment, the base metal 102 has a thermal expansion coefficient of about 17.6 μm/m·K, the first filler to make the first layer 104 has a thermal expansion coefficient of about 12.8 μm/m·K, the second filler to make the second layer 106 has a thermal expansion coefficient of about 10.2 μm/m·K, and combinations thereof.

In one embodiment, the first filler to make the first layer 104 and/or the second filler to make the second layer 106 is selected such that the difference in elongation of the first layer 104 and/or the second layer 106 in comparison to the base metal 102 is a predetermined difference of elongation. As used herein, the term "elongation" refers to the material extension during the tensile strength testing at a constant temperature. For example, elongation is measured extending a metal and comparing a length of the metal prior to being extended to an extended length of the metal at the point the metal fractures. In this embodiment, the first filler elongation is slightly above or below the base metal elongation and the second filler elongation is greater than the first filler elongation.

In one embodiment, the predetermined difference of elongation between the first layer 104 and the base metal 102 is between a value of about 32 percent and a value of about 36 percent (i.e., the value of the first filler elongation minus the value of the base metal elongation), at a value of about 34.5 percent (i.e., the value of the first filler elongation minus the value of the base metal elongation), between a comparative range of about 75 percent and about 85 percent (i.e., the value of the first filler elongation minus the value of the base metal elongation and all divided by the value of the first filler elongation), and/or at about 81 percent (i.e., the value of the first filler elongation minus the value of the base metal elongation and all divided by the value of the first filler elongation).

In one embodiment, the predetermined difference of elongation between the second filler to make the second layer 106 and the first filler to make the first layer 104 is between a value of about 29.5 percent and a value of about 36.5 percent (i.e., the value of the second filler elongation minus the value of the first filler elongation), at a value of about 33 percent (i.e., the value of the second filler elongation minus the value of the first filler elongation), or between a comparative range of about 69.5 percent and about 86 percent (i.e., the value of the second filler elongation minus the value of the first filler elongation and all divided by the value of the second filler elongation).

In one embodiment, the base metal 102 has an elongation of about 8.0 percent, the first filler to make the first layer 104 has an elongation between about 6 percent and about 13 percent, and the second filler to make the second layer 106 has an elongation of about 42.5 percent.

In one embodiment, the first filler to make the first layer 104 and/or the second filler to make the second layer 106 is selected such that the difference in the yield strength of the first filler and/or the second filler in comparison to the base metal 102 is a predetermined difference of yield strength. As used herein, the term "yield strength" refers to the resistance of a metal to stress at which a material begins to plastically deform. In this embodiment, the first filler yield strength is greater than the base metal yield strength, the second filler yield strength is greater than both the first filler yield strength and the base metal yield strength.

In one embodiment, the predetermined difference of yield strength between the first filler to make the first layer 104 and the base metal 102 is between about 15 Ksi and about 22 Ksi (i.e., the value of the first filler yield strength minus the value of the base metal yield strength), at about 18.5 Ksi (i.e., the value of the first filler yield strength minus the value of the base metal yield strength), between about 50 percent and about 73 percent (i.e., the value of the first filler yield strength minus the value of the base metal yield strength and all divided by the value of the base metal yield strength), and/or at about 61.5 percent (i.e., the value of the base metal yield strength minus the value of the base metal yield strength and all divided by the value of the base metal yield strength).

In one embodiment, the predetermined difference of yield strength between the second filler to make the second layer 106 and the first filler to make the first layer 104 is between about 23 Ksi and about 30 Ksi (i.e., the value of the second filler yield strength minus the value of the first filler yield strength), at about 26.5 Ksi (i.e., the value of the second filler yield strength minus the value of the first filler yield strength), between about 30 percent and about 40 percent (i.e., the value of the second filler yield strength minus the value of the first filler yield strength and all divided by the value of the second filler yield strength), and/or at about 35 percent (i.e., the value of the second filler yield strength minus the value of the first filler yield strength and all divided by the value of the second filler yield strength).

In one embodiment, the base metal 102 has a yield strength of about 30 Ksi, the first filler to make the first layer 104 has a yield strength of about 45 Ksi to about 52 Ksi, and/or the second filler to make the second layer 106 has a yield strength of about 75 Ksi.

In one embodiment, the base metal composition is a nickel-resist cast type D-2 within a composition range by weight of up to about 3.0 percent carbon, about 1.75 percent to about 3.00 percent silicon, about 0.70 percent to about 1.0 percent manganese, about 1.75 percent to about 2.5 percent chromium, about 73.5 percent iron, and a balance of nickel (for example, between about 18 percent to about 22 percent nickel). The nickel-resist cast type D-2 provides resistance to corrosion, erosion, and frictional wear up to temperatures of about 1400° F. (about 760° C.).

In one embodiment, the first filler composition is by weight between about 1.0 percent and about 1.5 percent carbon, between about 50 percent and about 55 percent nickel, and between about 42.5 percent and about 47.5 percent iron. In a further embodiment, the composition is by weight between about 1.2 percent carbon, about 53 percent nickel, and about 45.0 percent iron.

In one embodiment, the second filler composition has a composition range of up to about 0.1 percent carbon, about 20 percent to about 23 percent chromium, about 5.0 percent iron, about 1.0 percent cobalt, between about 8.0 percent and about 10.0 percent molybdenum, between about 20 percent and about 23 percent chromium, and a balance of nickel.

In one embodiment, the base metal composition and the first filler composition include about the same carbon content and nickel content, the first filler thermal expansion coefficient is less than both the base metal thermal expansion coefficient and the second filler thermal expansion coefficient, the first filler yield strength is greater than the base metal yield strength, but less than the second filler yield strength, and the first filler elongation is greater than both the base metal elongation and the second filler elongation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of processing a component, the method comprising:
    providing a base metal having a feature, the base metal having a base metal composition, a base metal thermal expansion coefficient, a base metal yield strength, and a base metal elongation;
    removing the feature to form a processed region;
    applying a first layer to the processed region, the first layer having a first filler, the first filler having a first filler composition, a first filler thermal expansion coefficient, a first filler yield strength, and a first filler elongation; and
    applying a second layer to the first layer, the second layer having a second filler, the second filler having a second filler composition, a second filler thermal expansion coefficient, a second filler yield strength, and a second filler elongation;
    wherein the first filler thermal expansion coefficient is less than both the base metal thermal expansion coefficient and the second filler thermal expansion coefficient;
    wherein the first filler yield strength is greater than the base metal yield strength and less than the second filler yield strength; and
    wherein the first filler elongation is greater than the base metal elongation and less than the second filler elongation.

2. The method of claim 1, wherein the first filler thermal expansion coefficient is less than the base metal thermal expansion coefficient by between about 5.0 μm/m·K and about 10.0 μm/m·K.

3. The method of claim 1, wherein the second filler thermal expansion coefficient is greater than the first filler thermal expansion coefficient by between about 1.3 μm/m·K and about 4.3 μm/m·K.

4. The method of claim 1, wherein the base metal thermal expansion coefficient is about 17.6 μm/m·K, the second filler thermal expansion coefficient is about 10.2 μm/m·K, and the first filler thermal expansion coefficient is about 12.8 μm/m·K.

5. The method of claim 1, wherein the first filler elongation is greater than the base metal elongation by between about 32 percent and 36 percent.

6. The method of claim 1, wherein the first filler elongation is less than the second filler elongation by between about 29.5 percent and about 36.5 percent.

7. The method of claim 1, wherein the base metal has an elongation of about 8.0 percent, the first filler has an elongation of about 6 percent to about 13 percent, and the second filler has an elongation of about 42.5 percent.

8. The method of claim 1, wherein the first filler yield strength is greater than the base metal yield strength by between about 15 Ksi and about 22 Ksi.

9. The method of claim 1, wherein the second filler yield strength is greater than the first filler yield strength by about 23 Ksi to about 30 Ksi.

10. The method of claim 1, wherein the base metal yield strength is about 30 Ksi, the first filler yield strength is between about 45 Ksi and about 52 Ksi, and the second filler yield strength is about 75 Ksi.

11. The method of claim 1, wherein the base metal composition and the first filler composition include about the same carbon and nickel concentration.

12. The method of claim 1, wherein the component is a gas turbine component selected from the group consisting of a blade, rotor, a diaphragm, and a bucket.

13. The method of claim 1, wherein the first filler composition includes by weight between about 1.0 percent and about 1.5 percent carbon, between about 42.5 percent and about 47.5 percent iron, and a balance of nickel.

14. The method of claim 1, wherein the second filler composition includes by weight up to about 0.1 percent carbon, about 5.0 percent iron, about 1.0 percent cobalt, between about 8.0 percent and about 10.0 percent molybdenum, between about 20 percent and about 23 percent chromium, and a balance of nickel.

15. The method of claim 1, wherein the welding process is selected from the group of processes consisting of gas tungsten arc welding, gas metal arc welding, shielded metal arc welding, flux core arc welding, submerged arc welding, and combinations thereof.

16. A method of processing a component, the method comprising:
providing a base metal having a feature, the base metal having a base metal composition, a base metal thermal expansion coefficient, a base metal yield strength, and a base metal elongation;
removing the feature to form a processed region;
applying a first layer to the processed region, the first layer having a first filler, the first filler having a first filler composition, a first filler thermal expansion coefficient, a first filler yield strength greater than the base metal yield strength, and a first filler elongation greater than the base metal elongation; and
applying a second layer to the first layer, the second layer having a second filler, the second filler having a second filler composition, a second filler thermal expansion coefficient, a second filler yield strength greater than the first filler yield strength, and a second filler elongation greater than the first filler elongation;
wherein the first filler composition includes by weight between about 1.2 percent and about 1.5 percent carbon, between about 42.5 percent and about 47.5 percent iron, and a balance of nickel; and
wherein the second filler composition includes by weight up to about 0.1 percent carbon, about 20 percent to about 23 percent chromium, about 5.0 percent iron, about 1.0 percent cobalt, between about 8.0 percent and about 10.0 percent molybdenum, between about 20 percent and about 23 percent chromium, and a balance of nickel.

17. A processed component, comprising:
a base metal having a base metal composition, a base metal thermal expansion coefficient, a base metal yield strength, and a base metal elongation;
a processed region;
a first layer applied to the processed region, the first layer having a first filler, the first filler having a first filler composition, a first filler thermal expansion coefficient, a first filler yield strength, and a first filler elongation; and
a second layer applied to the first layer, the second layer having a second filler, the second filler having a second filler composition, a second filler thermal expansion coefficient, a second filler yield strength, and a second filler elongation;
wherein the first filler thermal expansion coefficient is less than both the base metal thermal expansion coefficient and the second filler thermal expansion coefficient;
wherein the first filler yield strength is greater than the base metal yield strength and less than the second filler yield strength; and
wherein the first filler elongation is greater than the base metal elongation and less than the second filler elongation.

18. The component of claim 17, wherein the component is a gas turbine component selected from the group consisting of a blade, rotor, a diaphragm, and a bucket.

19. The component of claim 17, wherein the second filler thermal expansion coefficient is greater than the first filler thermal expansion coefficient by between about 1.3 μm/m·K and about 4.3 μm/m·K.

20. The component of claim 17, wherein the first filler elongation is less than the second filler elongation by between about 29.5 percent and about 36.5 percent.

* * * * *